US009264434B2

(12) United States Patent
David

(10) Patent No.: US 9,264,434 B2
(45) Date of Patent: Feb. 16, 2016

(54) FILE PRESENCE DETECTION AND MONITORING

(75) Inventor: Jean-Pierre David, Laval (CA)

(73) Assignee: POLYVALOR, LIMITED PARTNERSHIP, Montreal, Quebec (CA)

( * ) Notice: Subject to any disclaimer, the term of this patent is extended or adjusted under 35 U.S.C. 154(b) by 130 days.

(21) Appl. No.: 12/995,337

(22) PCT Filed: Jun. 1, 2009

(86) PCT No.: PCT/CA2009/000762
§ 371 (c)(1),
(2), (4) Date: Feb. 7, 2011

(87) PCT Pub. No.: WO2009/146536
PCT Pub. Date: Dec. 10, 2009

(65) Prior Publication Data
US 2011/0145267 A1    Jun. 16, 2011

Related U.S. Application Data

(60) Provisional application No. 61/057,944, filed on Jun. 2, 2008.

(51) Int. Cl.
G06G 7/00 (2006.01)
G06F 17/30 (2006.01)
(Continued)

(52) U.S. Cl.
CPC ............ *H04L 63/10* (2013.01); *G06F 21/6209* (2013.01); *H04L 63/0227* (2013.01); *G06F 2221/0737* (2013.01); *G06F 2221/2101* (2013.01); *H04L 12/585* (2013.01)

(58) Field of Classification Search
CPC ............... G06F 17/30156; G06F 17/30194; G06F 17/3038; G06F 17/3005; G06F 11/30; G06F 21/00; G06F 2221/0737; G06F 2221/2101; G06F 21/6209; G06F 21/562; G06F 21/62; G06F 17/30159; G06F 17/30162; G06F 17/30206; H04L 12/16; H04L 12/585; H04L 63/0227; H04L 63/10; H04L 12/58; H04L 29/06; H04L 63/145; H04L 21/562; H04L 62/02
USPC .......................................... 707/758, 698, 825
See application file for complete search history.

(56) References Cited

U.S. PATENT DOCUMENTS 5,349,580 A  *  9/1994  Hester et al. ................... 370/461
5,918,225 A  *  6/1999  White ............... G06F 17/30324
(Continued)

FOREIGN PATENT DOCUMENTS

JP   2002-050956   2/2002
JP   2006-221586   8/2006
WO   WO 0049717    8/2000

OTHER PUBLICATIONS

Matthew et al., Learning nonstationary models of normal network traffic for detecting novel attacks; SIGKDD '02, Proceedings of the eighth ACM SIGKDD international conference on Knowledge discovery and data mining; pp. 376-385.*
(Continued)

*Primary Examiner* — Daniel Kuddus
(74) *Attorney, Agent, or Firm* — Norton Rose Fulbright Canada LLP

(57) ABSTRACT

There is described a module for detecting an electronic file, the module embodied on a computer readable medium and configured for: receiving a portion of a file and extracting content from the portion; applying an initial hashing function numerous times to the content, the initial hashing function being applied to each one of a plurality of blocks of elements within the content and resulting in a representation for each one of the blocks; selecting one of the representations from multiple representations as an initial imprint for the file portion; comparing the initial imprint to contents of a first memory containing a plurality of detection imprints for known electronic files to be detected, the detection imprints having been created using at least the initial hashing function; and determining a match when the initial imprint corresponds to a detection imprint in the first memory.

17 Claims, 13 Drawing Sheets

(51) Int. Cl.
*H04L 29/06* (2006.01)
*G06F 21/62* (2013.01)
*H04L 12/58* (2006.01)

(56) References Cited

U.S. PATENT DOCUMENTS

| | | | |
|---|---|---|---|
| 6,064,738 A * | 5/2000 | Fridrich | 380/28 |
| 6,128,483 A * | 10/2000 | Doiron et al. | 455/419 |
| 6,243,079 B1 * | 6/2001 | Liu | 345/168 |
| 6,442,571 B1 * | 8/2002 | Haff et al. | 380/244 |
| 6,654,889 B1 | 11/2003 | Trimberger | |
| 6,757,675 B2 | 6/2004 | Aiken et al. | |
| 6,947,933 B2 * | 9/2005 | Smolsky | 707/693 |
| 7,003,619 B1 * | 2/2006 | Moore et al. | 711/102 |
| 7,043,052 B2 | 5/2006 | Rhoads | |
| 7,080,041 B2 | 7/2006 | Nagel | |
| 7,117,358 B2 * | 10/2006 | Bandini ........ H04L 12/585 | 380/259 |
| 7,152,047 B1 | 12/2006 | Nagel | |
| 7,249,251 B2 * | 7/2007 | Todd et al. | 713/1 |
| 7,430,645 B2 * | 9/2008 | Todd et al. | 711/161 |
| 7,477,739 B2 * | 1/2009 | Haitsma ........ G06F 17/3002 | 380/201 |
| 7,508,945 B1 * | 3/2009 | Ferre Herrero ..... H04L 9/0656 | 380/268 |
| 7,657,581 B2 * | 2/2010 | Orenstein et al. | 707/661 |
| 7,660,865 B2 * | 2/2010 | Hulten et al. | 709/207 |
| 7,747,858 B2 * | 6/2010 | Serret-Avila ..... G06T 1/0071 | 713/168 |
| 7,773,748 B2 * | 8/2010 | Urivskiy ............ G06F 7/588 | 380/46 |
| 7,792,325 B2 * | 9/2010 | Rhoads ............... G06F 3/017 | 382/100 |
| 7,894,358 B2 * | 2/2011 | Martin et al. | 370/252 |
| 8,059,551 B2 * | 11/2011 | Milliken ......... H04L 63/1466 | 370/252 |
| 8,082,233 B2 | 12/2011 | Bhandari | |
| 2002/0129140 A1 | 9/2002 | Peled et al. | |
| 2003/0028775 A1 * | 2/2003 | Bleumer et al. | 713/176 |
| 2003/0039381 A1 * | 2/2003 | Ziesig | 382/124 |
| 2003/0120647 A1 * | 6/2003 | Aiken ............ G06F 17/30628 | |
| 2004/0073617 A1 * | 4/2004 | Milliken ........... G06F 21/562 | 709/206 |
| 2005/0188032 A1 | 8/2005 | Yamazaki et al. | |
| 2006/0282676 A1 * | 12/2006 | Serret-Avila et al. . G06T 1/0071 | 713/176 |
| 2007/0160062 A1 * | 7/2007 | Morishita .......... H04L 63/0227 | 370/395.31 |
| 2008/0228939 A1 * | 9/2008 | Samuels ............... H04L 67/28 | 709/235 |
| 2010/0049760 A1 * | 2/2010 | Rousseau et al. | 707/692 |

OTHER PUBLICATIONS

Batory, D.S. Univ. of Toronto, Canada. Optimal file designs and reorganization points; ACM Transactions on Database Systems (TODS); vol. 7 Issue 1, Mar. 1982. pp. 60-81.*
International Search Report issued on Sep. 21, 2009 with respect to corresponding International Patent Application No. PCT/CA2209/000762.

* cited by examiner

At the binary level, a file is a list of bytes

| Position | Value |
|---|---|
| 1 | 1 |
| 2 | 243 |
| 3 | 144 |
| 4 | 57 |
| 5 | 81 |
| 6 | 48 |
| 7 | 189 |
| ... | ... |
| 13 | 72 (H) |
| 14 | 69 (E) |
| 15 | 76 (L) |
| 16 | 76 (L) |
| 17 | 79 (O) |
| 18 | 77 (M) |
| 19 | 89 (Y) |
| 20 | 78 (N) |
| 21 | 65 (A) |
| 22 | 77 (M) |
| 23 | 69 (E) |
| 24 | 73 (I) |
| 25 | 83 (S) |

352

| Position | Value | |
|---|---|---|
| 1 | 1 | Hash 1 |
| 2 | 243 | Hash 2 |
| 3 | 144 | Hash 3 |
| 4 | 57 | |
| 5 | 81 | |
| 6 | 48 | |
| 7 | 189 | |
| ... | ... | |
| 13 | 72 (H) | |
| 14 | 69 (E) | |
| 15 | 76 (L) | |
| 16 | 76 (L) | |
| 17 | 79 (O) | |
| 18 | 77 (M) | |
| 19 | 89 (Y) | |
| 20 | 78 (N) | |
| 21 | 65 (A) | |
| 22 | 77 (M) | |
| 23 | 69 (E) | |
| 24 | 73 (I) | |
| 25 | 83 (S) | |

| | | |
|---|---|---|
| 999879 | 162 | |
| 999880 | 96 | |
| 999881 | 123 | |
| 999882 | 54 | |
| 999883 | 117 | Hash 99883 |
| 999884 | 126 | Hash 99884 |
| 999885 | 18 | Hash 99885 |
| 999886 | 39 | |
| 999887 | 42 | |
| 999888 | 9 | |
| ... | | |
| 999994 | 35 | |
| 999995 | 90 | |
| 999996 | 195 | |
| 999997 | 210 | |
| 999998 | 30 | |
| 999999 | 150 | |
| 1000000 | 240 | |

354

Imprint = MAX (Hash 1, ..., Hash 99885)

FIGURE 3B

For a minute or two she stood looking at the house, and wondering what to do next, when suddenly a footman in livery came running out of the wood--(she considered him to be a footman because he was in livery: otherwise, judging by his face only, she would have called him a fish)--and rapped loudly at the door with his knuckles. It was opened by another footman in livery, with a round face, and large eyes like a frog; and both footmen, Alice noticed, had powdered hair that curled all over their heads. She felt very curious to know what it was all about, and crept a little way out of the wood to listen.

...

She had not gone much farther before she came in sight of the house of the March Hare: she thought it must be the right house, because the chimneys were shaped like ears and the roof was thatched with fur. It was so large a house, that she did not like to go nearer till she had nibbled some more of the lefthand bit of mushroom, and raised herself to about two feet high: even then she walked up towards it rather timidly, saying to herself 'Suppose it should be raving mad after all! I almost wish I'd gone to see the Hatter instead!'

FIGURE 4A

Foraminuteortwoshestodlokingatthehouse,andwonderingwhattod
onext,whensudenlyafotmaninliverycameruningoutofthewod-
(sheconsideredhimtobeafotmanbecausehewasinlivery:otherwi
se,judgingbyhisfaceonly,shewouldhavecalednimafish)-
andrapedloudlyatthedorwithhisknuckles.Itwasopenedbyanoth
erfotmaninlivery,witharoundface,andlargeeyeslikeafrog;an
dbothfotmen,Alicenoticed,hadpowderedhairthatcurledalover
theirheads.Shefeltver

...

'Idon'tknowofanythatdo, 'Alicesaidverypolitely,felingquitep
leasedtohavegotintoaconversation. 'Youdon'tknowmuch, 'said
theDuches; 'andthat'

...

mneysweresshapedlikeearsandtherofwasthatchedwithfur.Itwasso
largeahouse,thatshedidnotliketogonearertilshehadnibledso
memoreoftheleftandbitofmushrom,andraisedherselftoaboutt
wofethigh:eventhenshewalkeduptowardsitrathertimidly,sayi
ngtoherself'Suposeitshouldberavingmadafteral!Ialmostwish
I'dgonetoseetheHaterinstead!'

FIGURE 4B

Foraminuteortwoshestoodlookingatthehouse,andwonderingwhattod
yafotmaninliverycamerunningoutofthewod-
mtobeafotmanbecausehewasinlivery:otherwi
aceonly,shewouldhavecaledhimafish)-
thedorwithhisknuckles.Itwasopenedbyanoth
,witharoundface,andlargeeyeslikeafrog;an
enoticed,hadpowderedhairthatcurledalover
theirheads.Shefeltver

Current Hash-value
0x3ead6b31ca8e7544

Current Imprint
0xedbb925b6ca6b761

'Idon'tknowofanythatdo,'Alicesaidverypolitely,felingquitep
leasedtohavegotintoaconversation.'Youdon'tknowmuch,'said
theDuches;'andthat'

...

mneyswereshapedlikeearsandtherofwasthatchedwithfur.Itwasso
largeahouse,thatshedidnotliketogonearertilshehadnibledso
memorefortheleftandbitofmushrom,andraisedherselftoaboutt
wofethigh:eventhenshewalkeduptowardsitrathertimidly,sayi
ngtoherself'Suposeitshouldberavingmadafteral!Ialmostwish
I'dgonetosetheHaterinstead!'

FIGURE 4C

Foraminuteortwoshestodlookingatthehouse,andwonderingwhattod
onext,whensudenlyafotmanilliverycamerunningoutofthewod-
(sheconsideredhimtobeafotmanbecausehewasinlivery:otherwi
se,judgingbyhisfaceonly,shewouldhavecaledhimafish)-
andrapedloudlyatthedorwithhisknuckles.Itwasopenedbyanoth
erfotmaninlivery,witharoundface,andlargeeyeslikeafrog;an
dbothfotmen,Alicenoticed,hadpowderedhairthatcurledalover
theirheads.Shefeltver

...

'Idon'tknowofanythatdo,'Alicesaidverypolitely,felingquitep
leasedtohavegotintoaconversation.'Youdon'tknowmuch,'said
theDuches;

mneyweresha rofwasthatchedwithfur.Itwasso
largeahous ketogonearertilshehadnibledso
memoreofth shrom,andraisedherselftoaboutt
wofethigh: huptowardsitrathertimidly,sayi
ngtoherself'Suposeitshouldberavingmadafteral!Ialmostwish
I'dgonetosetheHaterinstead!'

Current Hash-value
0xffefa93dac07302e...

Current Imprint
0xffefa93dac07302e

FIGURE 4D

FILE PRESENCE DETECTION AND MONITORING

CROSS REFERENCE TO RELATED APPLICATIONS

This patent application claims priority from U.S. provisional patent application No. 61/057,944, entitled "Network file transmission monitoring", filed on Jun. 2, 2008, the specification of which is hereby incorporated by reference.

FIELD OF THE INVENTION

The present invention relates to file presence monitoring, and more particularly, to the detection of a particular file or portion of a file, as it is being transmitted from a source to a destination or stored on a storage medium.

BACKGROUND

Many organizations need to ensure that certain files are not transmitted over a network, or are transmitted in a secure manner, in order to maintain confidentiality of these files. This can be achieved by monitoring a network for known file transfers which are for example, sent from non-authorized sources, or to non-authorized destinations, or propagated over a non-expected part of a network, and at a non-probable time. Government and public security agencies also benefit from cyber-watch or cyber-surveillance to catch potential offenses, illicit file possessions and the like. Cyber-surveillance is also helpful in the fight against cyber-viruses and to enforce copyright protection.

Current cyber-surveillance is typically achieved using software-based "sniffers" which extract certain patterns or characteristics from data transmitted over a network. Once extracted, the data is then analyzed. In most cases, data that has been transmitted on various network layers is entirely reconstructed before further processing can be done to identify the file. Such schemes are time consuming and require a considerable amount of processing resources. File detection is thus only achieved after the data has been transmitted over the network, even where the transfer occurs at relatively low data rates such as 100 Mb/s.

There is therefore a need for an improved method and system for detecting known files, either during transmission or statically when stored on a medium.

SUMMARY

There is described herein methods and systems for detecting known files, either during transmission of an electronic file over a network or when the file is stored on a medium.

According to a first embodiment, there is provided a module for detecting a known electronic file, the module embodied on a computer readable medium and configured for: receiving a portion of a file and extracting content from the portion; applying an initial function numerous times to the content, the initial function being applied to each one of a plurality of blocks of elements within the content and resulting in a representation for each one of the blocks; selecting one of the representations from multiple representations as an initial imprint for the file portion; comparing the initial imprint to contents of a first memory containing a plurality of detection imprints for known electronic files to be detected, the detection imprints having been created using at least the initial function; and determining a match when the initial imprint corresponds to a detection imprint in the first memory.

According to another embodiment, there is provided a network executing a software process for detecting a known electronic file, the network containing at least one computer, the computer configured for: receiving a portion of a file and extracting content from the portion; applying an initial function numerous times to the content, the initial function being applied to each one of a plurality of blocks of elements within the content and resulting in a representation for each one of the blocks; selecting one of the representations from multiple representations as an initial imprint for the file portion; comparing the initial imprint to contents of a first memory containing a plurality of detection imprints for known electronic files to be detected, the detection imprints having been created using at least the initial function; and determining a match when the initial imprint corresponds to a detection imprint in the first memory.

According to another embodiment, there is provided a computer-implemented method for detecting a known electronic file, the method comprising the steps of: receiving a portion of a file and extracting content from the portion; applying an initial function numerous times to the content, the initial function being applied to each one of a plurality of blocks of elements within the content and resulting in a representation for each one of the blocks; selecting one of the representations from multiple representations as an initial imprint for the file portion; comparing the initial imprint to contents of a first memory containing a plurality of detection imprints for known electronic files to be detected, the detection imprints having been created using at least the initial function; and determining a match when the initial imprint corresponds to a detection imprint in the first memory.

According to yet another embodiment, there is provided a network of digital devices for detecting a known electronic file, the network of digital devices configured for receiving a portion of a file and extracting content from the portion; applying an initial function numerous times to the content, the initial function being applied to each one of a plurality of blocks of elements within the content and resulting in a representation for each one of the blocks; selecting one of the representations from multiple representations as an initial imprint for the file portion; comparing the initial imprint to contents of a first memory containing a plurality of detection imprints for known electronic files to be detected, the detection imprints having been created using at least the initial function; and determining a match when the initial imprint corresponds to a detection imprint in the first memory.

The network of digital devices may include processors, memories, microcontrollers, microprocessors, field programmable gate arrays, logical gate arrays, semiconductor devices such as transistors, or any equivalent or known digital devices that may be configured accordingly.

It should be understood that the methods and systems may be used to detect the presence of a file or a portion of a file over a network or stored on a storage medium. Having a portion of a file pass through a first router/server and another portion of the same file pass through a second router/server may lead to only some of the representations being detected, but if enough of them are received then the file can be detected. The same applies to portions of a file stored on a medium, such as a hard drive, a DVD, a CD, a USB key, or any other support medium. When a file is stored, it may be fragmented into parts and stored in various sectors or segments of the medium. The sectioned portions of the file may be detected even if they are not stored in two consecutive sectors and even if not all the segments are present (e.g. partially deleted files).

In the present specification, the term "representation" refers to a distinguishing mark assigned to a group of elements belonging to a portion of a file to be monitored, or to a file portion being detected. The "representation" can be assigned by applying a function to the group of elements. The term "function" applies to any function, mathematical or non-mathematical, that will transform the element into something that may then be used as a representation. In some embodiments, the function will reduce the overall number of bits being considered in a bit file, such as a hashing or a sliding hashing function. However, other types of functions may be used, such as a function that transforms a set of bits into a numerical value, or a function that will take structural data elements in a zero-dimensional file and create a representation therefrom.

Additionally, in the present specification, the term "imprint" refers to a representation or a group of representations which are selected from an initial set of representations assigned to a same group of elements, such as bits, belonging to a portion of a file or to a file. The selection can be done using one or a set of functions, or arbitrarily. The imprint is then assigned to the portion of the file or to the file. If only one representation is assigned to a group of elements, the representation forms the imprint for that group of elements.

The expression "extra data" refers to a portion of the file that includes the group of bits associated to an "imprint" and it corresponds to data surrounding those bits, including those bits. The amount of data selected as "extra data" is variable and will depend on the level of confidence which is desired for a given match. The extra data are not mandatory.

Finally, in the present specification, the term "signature" refers to multiple imprints which are assigned to one entire file to be monitored. The signature contains all the imprints determined for one file. If only one imprint is assigned to a file, this imprint forms the file signature.

The module embodied on a computer readable medium may be provided on a USB key, on a cell phone, on a hard drive, on a CD/DVD, or on any other type of support or memory for electronic media.

BRIEF DESCRIPTION OF THE DRAWINGS

Reference will now be made to the accompanying drawings, showing by way of illustration embodiments thereof and in which:

FIG. 1b is a flow chart illustrating the step of configuring of FIG. 1a;

FIG. 3b illustrates an example of the text file portion of FIG. 3a being represented at the binary level and a sliding hashing function being applied to the file portion;

FIG. 4a is a sample block of text taken from Alice in Wonderland;

FIG. 4b is the sample block of text from FIG. 4a after it has been filtered;

FIG. 4c illustrates the filtered block of text while the hashing algorithm is being applied and a current hash-value is not retained as a max hash-value;

FIG. 4d illustrates the filtered block of text while the hashing algorithm is being applied and a current hash-value is retained as a max hash-value;

FIG. 5b is a flow chart showing an embodiment of the method of FIG. 1a;

It will be noted that throughout the appended drawings, like features are identified by like reference numerals.

DETAILED DESCRIPTION

Electronic files can be transmitted over a network or stored on a static memory. In both cases they are fragmented into various file portions. In the case of a transmission, these portions are data packets. For a stored file, each portion can correspond to a track on a CD/DVD, or to a fragmented part of the file when stored on a hard drive, for example. Detection of a file does not require re-assembly of all portions when using the method described herein. The method and module herein disclosed permits the detection, in real-time, of the presence of a file or a portion of the file on a storage medium, or of the transmission of a given file or transmission of a portion of the file over a network or a network channel. The file does not need to be entirely present.

Figure 1A:
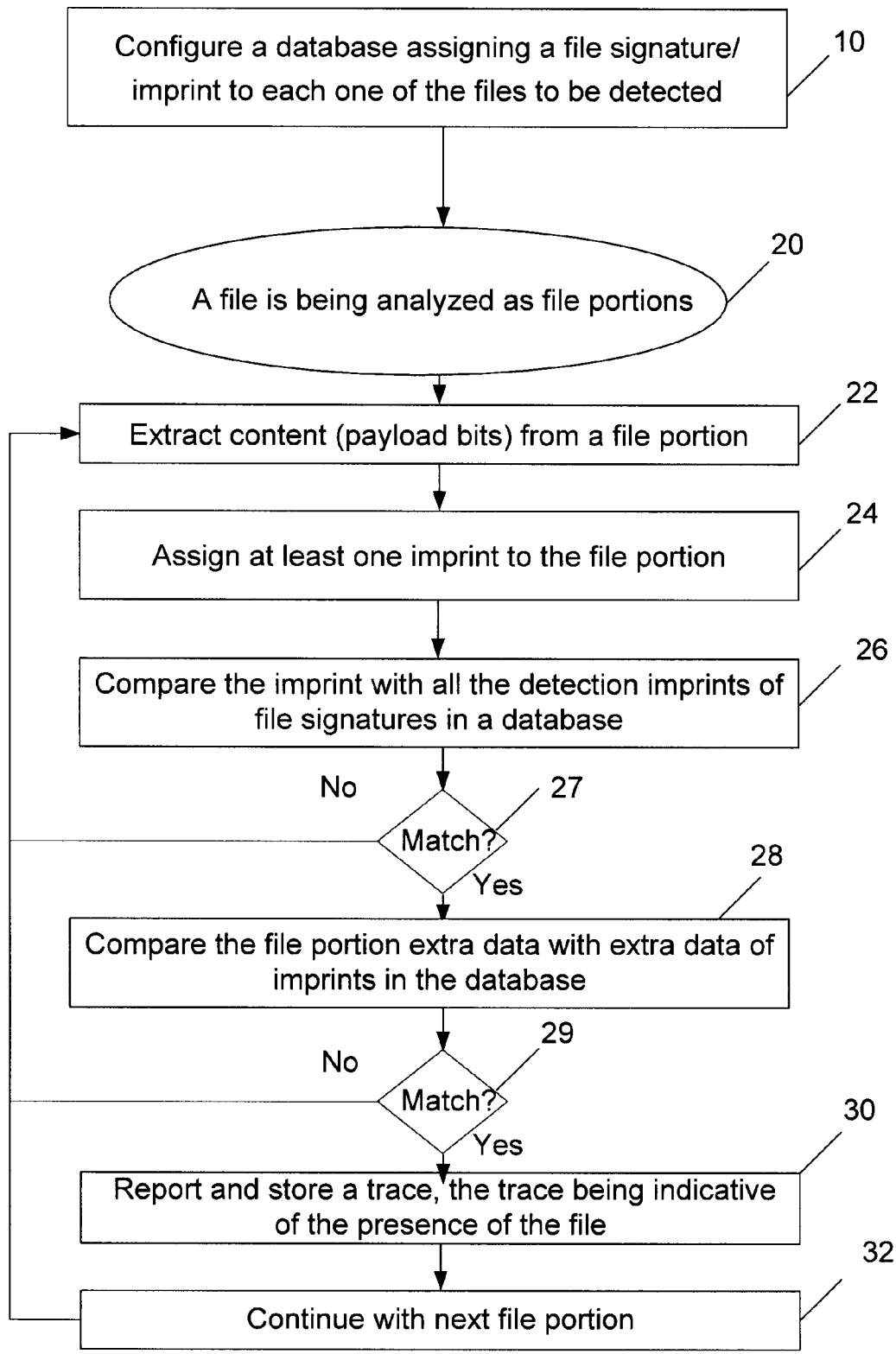
FIG. 1a is a flow chart of a method for detecting the presence of a file over a network or in a media, in accordance with one embodiment.

Referring to FIG. 1a, the method for detecting the presence of a file over a network or stored on a medium comprises the following steps. In step 10, a database is configured with file signatures each assigned to a file to be detected. The file signatures are obtained by applying one or more functions to portions of each file. Each file signature is built by assigning at least one imprint to each portion of the file. This step will be further detailed below. Once the file signatures are determined and stored in the database, the method permits the detection of one of the files or a portion of one of the files over the network as it is being transmitted, or the detection of a file or portion of a file present on a storage medium.

In step 20, a file is being analyzed. Each file portion contains elements related to the content of the file (such as payload bits), as well as encapsulation packaging and formatting elements. In a case of file transmission, these elements can indicate a source and a destination of transmission, and define protocol and formatting layers. Alternatively, the packaging and formatting elements can indicate a storage sector or, for example, a memory on which the file is stored.

Figure 3A:
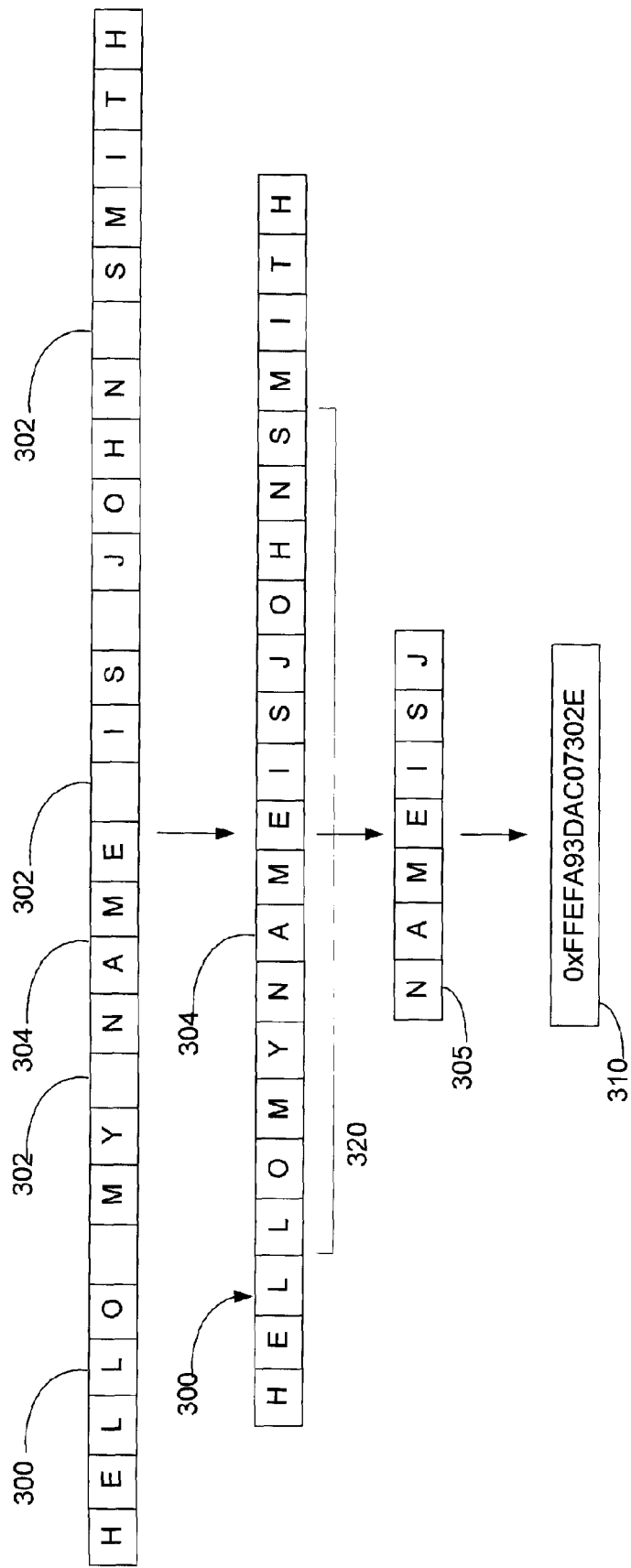
FIG. 3a is an example of a text file portion on which an imprint and extra data are provided in accordance with one embodiment.

In step 22, the payload bits are extracted from the file portion. Note that the protocol layers of the file portion do not need to be extracted, but rather only the information that is necessary for the further steps of detection. Referring to FIG. 3A, there is illustrated an example of a portion 300 of an electronic file for which an imprint 310 and extra data 320 are shown in accordance with one embodiment. In the case that some or all of the protocol information is also extracted from the file portion, it can be disregarded and treated as noise. This is performed when the file portion is analyzed. When extracting the payload bits, information such as a source and destination, sector, target port number or any other useful information being exchanged over the network can be stored separately to report additional information regarding the file transmission or storage once it is detected. Step 22 can involve filtering the payload bits to remove undesired bytes 302 such as spaces, tabs, end of lines, null characters or trivial redundancies.

In step 24, an imprint is assigned to the file portion by analyzing the content. This step may be performed while the file portion is passing over the network, in real-time. Step 24 involves applying the same function used at the time a signature is assigned to a file to obtain the imprint for the file portion.

In step 26, the imprint from a file portion is compared with all of the imprints of file signatures stored in the database. The database may be any form of memory or storage means.

In step 27, it is determined whether the imprint of the file portion matches one of the file portion imprints in the file signatures. If so, the method goes to step 28. If not, the method returns to step 22 with a next file portion.

In step 28, the method compares the extra data corresponding to the file portion imprint with the extra data of the imprint in the database found to be a match.

In step 29, it is determined whether extra data corresponding to the file portion imprint match the extra data of the matching imprint in the database to prevent random and partial matches. If so, the method goes to step 30. If not, the method returns to step 22 with a next file portion.

In step 30, a match is found. This indicates that at least a portion of the file associated with the file signature has been detected. This indication is referred to as a trace of a file presence. In other words, a trace is an indication that a file portion contains at least part of a given file being monitored. When a trace is detected, there is an elevated probability that the file associated with the matched file signature is indeed being transmitted over the network or stored on the storage medium. Step 30 involves reporting and storing the trace once it is determined from a matching between an imprint of a file portion and an imprint from a file signature. In the case of a file transmission, step 30 can also report a source and a destination of the file portion's transmission to a user or store such information for statistical purposes. In one embodiment, the entire file portion (including formatting information) is saved to allow any information to be extracted therefrom at any time in the future. In the case of a file stored on a storage medium, step 30 can also report any information related to the device or a location of the detected file portion on the storage medium.

In step 32, the method continues with a next file portion. Steps 22 to 32 are therefore repeated for each one of the file portions.

Figure 1B:
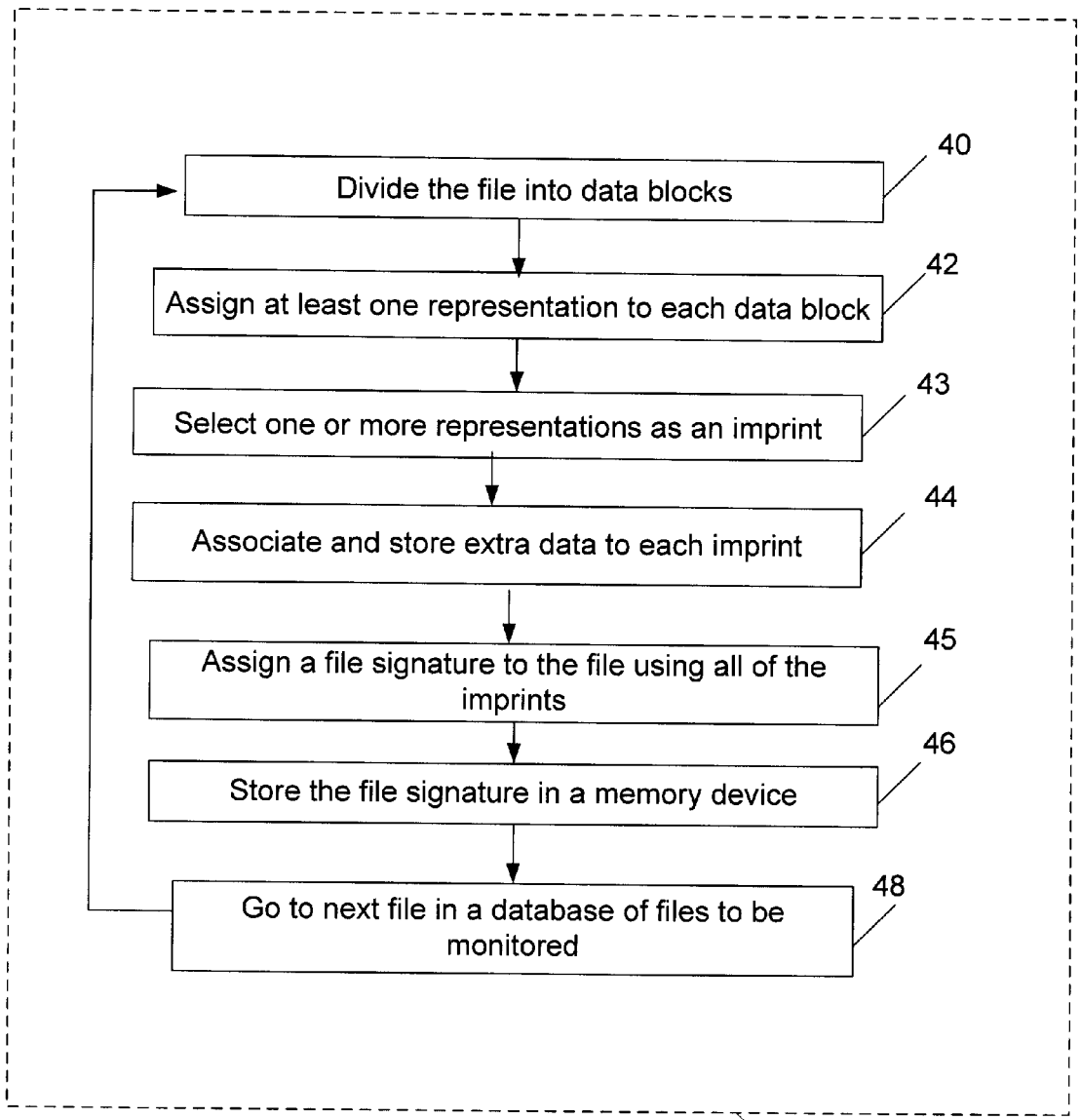

FIG. 1b illustrates in more detail step 10 of FIG. 1a, which corresponds to the initialization phase of the method whereby a database or memory is configured with detection imprints and signatures. In step 40, a file, or a portion of a file, is divided into a given number of data blocks. Each one of the data blocks therefore contains a number of bits belonging to the file. As indicated above, it is also possible to filter the file prior to dividing it into a number of data blocks.

In step 42, each data block is assigned to at least one representation. The representation can be any one of a numerical value, a mark or any form of characterization of the bits in the data block.

In one embodiment, each data block is further broken down into sub-blocks (further detailed in FIG. 3B) and each sub-block has a representation assigned thereto. In this case, one of the representations is selected as an imprint for each block. This is illustrated in step 43. If the blocks are not further broken down into sub-blocks, a block representation becomes an imprint for that block.

In step 45, extra data is stored in a database and associated to each imprint. The extra data is data surrounding the portion of the file associated with each imprint and permits a second level of confirmation of a detection for a file portion. In step 45, a file signature is determined using the imprints assigned to the data blocks.

In step 46, the file signature and the extra data are stored in a database. An identification of the file to which these signatures are associated with can also be stored. The database can be any structure enabling quick retrieval of the information such as a hash table, an associative memory, an indexed memory, and others. The extra data may also be stored in a memory allowing slower retrieval of the information, given that it is used less often and only when an imprint match occurs. The memory storing the extra data may be remote to the module or computer doing the actual detection.

In step 48, the system moves on to the next file or file portion in the database. Steps 40 to 46 are then repeated for this next file or file portion. Steps 40 to 48 produce a database of file signatures to be used for detecting files.

The present method is independent of protocol type and is tolerant to small changes to a file at the byte level. In the case of the detection of a file sent by email, the file may be encoded in BASE64 for example. In order to allow the detection of data presence in this format as well, both the original file and the BASE64 encoded files must be considered.

Figure 2:
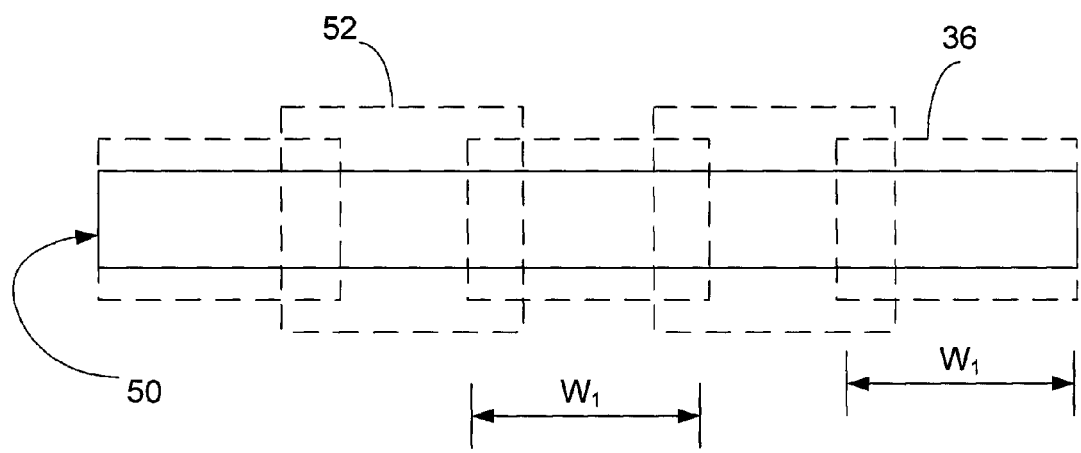
FIG. 2 is a schematic representation of an example of a division of a file, or of a file portion, to determine imprints associated thereto, in accordance with one embodiment.

FIG. 2 illustrates an example of a division of a file or a portion of a file as performed in step 40 of FIG. 1b.

The file portion 50 is divided into a number of data blocks 52 having a width (also referred to as a window) of size $W_1$. As illustrated in FIG. 2, the data blocks 52 overlap each other. Overlapping is optional. The overlapping scheme however generally ensures a higher probability of detecting a trace or a file transmission. To increase the probability of detecting a file transmission, an overlapping scheme may be used when dividing the file or portion of the file into blocks (and sub-blocks).

FIG. 3b illustrates a list of letters as a list of bytes when represented at the binary level 352. When applying a plurality of hashing functions to a consecutive sequence of bits, with a large overlap as per one embodiment, a sliding hash may be used 354. In an embodiment where the difference between each window being hashed is a single byte, the result of the sliding hash is that you have as many hashes as the number of bytes in the block of bytes. At least one of the hashes is then chosen as the imprint for this block (or file portion).

FIG. 4a is an illustrative example of part of a text, taken from the story *Alice in Wonderland*. These paragraphs represent a portion of a file, the file containing the entire story. In FIG. 4b, the text has been filtered to remove spaces and other unnecessary information. In FIG. 4c, the sliding hash is being applied to each series of 16 letters, and the third hash is illustrated. The hash value of this third hash is "0x3ead6b3lca87544". In this embodiment, the method is looking for the highest hashing value and so the current hash-value is compared to the last recorded highest value, which is identified as the "current imprint" and corresponds to "0xedbb925b6ca6b761". This hexadecimal value is higher than the current calculated hash value, and therefore the current value is not kept. FIG. 4d illustrates a further current hash-value which when compared to the previous "current imprint", was found to be higher and is therefore stored as the new "current imprint". Using this approach, the algorithm can be applied to the file in a systematic way and only a single value is stored at any one time. Alternative approaches are also possible, whereby each current hash-value is stored and the imprint is selected after all hashes have been applied.

Figure 5A:
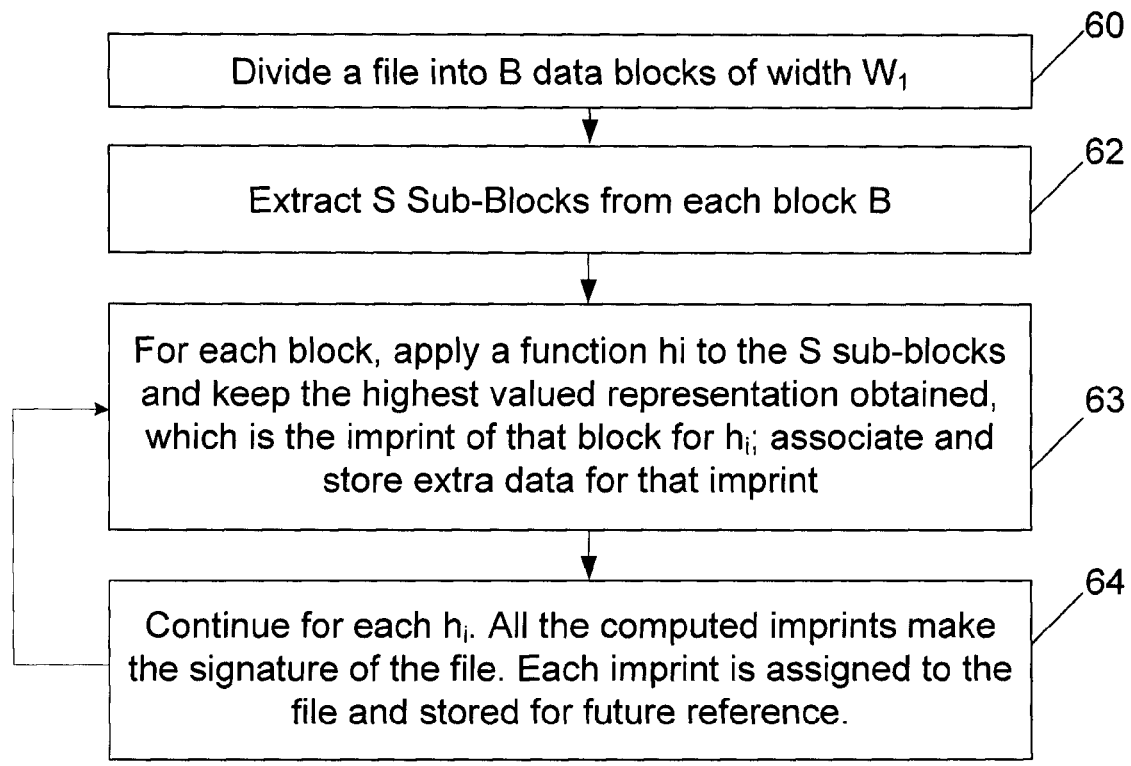
FIG. 5a is a flow chart showing an embodiment of the method of FIG. 1b.

Now referring to FIG. 5a, there is provided a detailed exemplary embodiment for steps 40 to 46 in the method of FIG. 1b.

In step 60, the file is divided into B data blocks, each of width $W_1$. The width $W_1$ can be made constant for all data blocks, or alternatively vary according to a given parameter, such as a known behavior.

For example, a file containing 20,480 bytes can be filtered to remove 480 bytes. The remaining 20,000 bytes are divided into B=4 overlapping data blocks:

b1=file [1 . . . 5015] (5015 bytes in size)
b2=file [5001 . . . 10015] (5015 bytes in size)
b3=file [10001 . . . 5015] (5015 bytes in size)
b4=file [15001 . . . 20000] (5000 bytes in size)

In step 62, to assign at least one representation to each data block as per step 42 of FIG. 1b, a group of N functions $h_i$ are applied to each one of the B data blocks, N being any integer from 1 to N. The application of the functions $h_i$ results in N representations being assigned to each one of the data blocks b1, b2, b3 and b4 for example, as a result of the N functions of $h_i$ applied thereto. In reference to FIG. 3b, the function $h_i$ can be a sliding hash function 354 for example, in which case a hash function $HF_i$ is applied to all possible contiguous S sub-blocks of width $W_2$ pre-extracted from each of the B data blocks. The application of the group of N functions to one data block therefore results in N×S representations being assigned to one data block, S being the number of sub-blocks. The representations can be any distinguishing attribute, such as numerical values or others.

In the above example of data blocks b1 to b4, N hash functions are applied to each sub-block of width $W_2$=16 bytes for example:

Data block b1 has S=5000 sub-blocks of width 16 extracted therefrom:
file[1 . . . 16], file[2 . . . 17], . . . file[5000 . . . 5015]
Data block b4 has S=4985 sub-blocks of width 16 extracted therefrom:
file[15001 . . . 15016], . . . file[19985 . . . 20000]

In step 63, given N=3, 3 hash functions $HF_i$ are applied to each sub-block S of each data block b1 to b4. This results in each data block B having 3 sets of 5000 hash results assigned thereto. The hash function $HF_i$ may consist in multiplying the numerical value of a sub-block by a constant $c_i$ and then to calculate the remainder using a modulo M (i.e. $HF_i(v)=v*c_i$ modulo M). A function $HF_i$ is therefore applied to the S sub-blocks of each block resulting in S hashes for each block and $h_i$. A function $m_i$ will select one of them, according to a given criteria, to be the imprint of that block for $h_i$. Extra data associated with the bits from that imprint are also stored.

In the above example of data blocks b1 to b4, given N=3, b1 has three maximums M1, M2 and M3 which are each selected from three sets of 5000 hashes resulting from $HF_1$, $HF_2$ and $HF_3$ respectively. The same occurs for b2 to b4, for a total of 12 maximums M1 to M12. The twelve selected values M1 to M12 are referred to as file imprints, and correspond to B×N, or 4 multiplied by 3.

The file signature and the extra data are then stored in a database in step 64.

It is noted that the representations resulting for one data block may not necessarily be numerical values, but alternatively, symbols, tags or any other characteristic element.

Figure 5B:
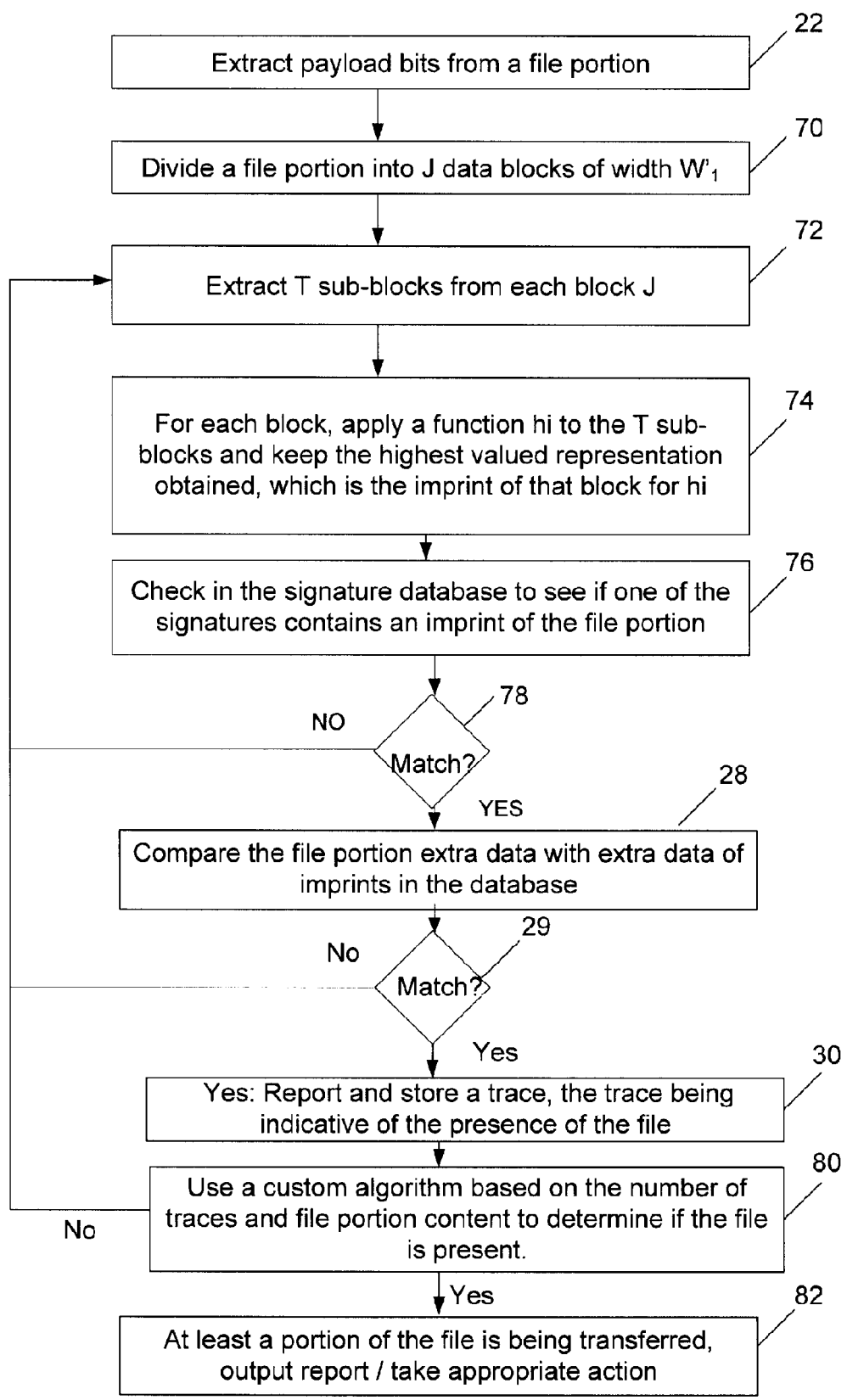

FIG. 5b illustrates a more detailed exemplary embodiment of the method as illustrated in FIG. 1a, in accordance with one embodiment. After having extracted the payload bits from the file portion in step 22, step 70 divides the payload bits of the file portion into J data blocks of window $W'_1$, J and $W'_1$ being chosen arbitrarily.

To assign an imprint to the file portion as in step (refer to FIG. 1a), N functions $h_i$, where i is any integer from 1 to N, are applied in step 74 to each block J of the file portion. The function $h_i$ is the same function as in step 63 of FIG. 5a. The application of these N functions $h_i$ results in a group of N representations being assigned to each data block in the packet. In reference to FIG. 3b, the function $h_i$ can be a sliding hash function 354 for example, in which case a hash function $HF_i$ is applied to all possible contiguous T sub-blocks of width $W'_2$ pre-extracted from each of the J data blocks. The application of the group of N functions to one data block therefore results in N×T representations being assigned to one data block, T being the number of sub-blocks. The representations can be any distinguishing attribute, such as numerical values or others.

As an example, given a file portion of size 1515 bytes and a payload of size 1465 bytes, from which 65 bytes are optionally removed therefrom for a payload of 1400 bytes, and J=2: the payload bits are divided into overlapping blocks j1=packet [1 . . . 715] of size 715 bytes and j2=packet [701 . . . 1400] of size 700 bytes. N functions $h_i$ are then applied to each one of the data blocks j1 and j2. If the functions $h_i$ are sliding hash functions for example, each one of the data blocks j1 and j2 are further sub-divided into a number of contiguous and overlapping sub-blocks T of width $W'_2$=16.

For N=3: Data block j1 is further divided into a number of sub-blocks T=700: packet[1 . . . 16], packet [2 . . . 17], . . . packet [700 . . . 715]. N=3 hash functions $HF_i$ are then applied to each sub-block, which results in three sets of 700 hashes sh1, sh2 and sh3, for 2100 values in total being associated to the data block j1.

Similarly, data block j2 is further divided into T=685: packet[701 . . . 715], . . . packet [1385 . . . 1400]. N=3 hash functions $HF_1$ are then applied to each sub-block, which results in three sets of 685 hashes sh1, sh2 and sh3, for 2055 values in total being associated to the data block j2.

To determine the imprints of the payload bits, one of the representations assigned to each data block is selected in step 74 by applying the function $m_i$ (refer to step 63 in FIG. 5a). The function $m_i$ can be any function which selects one representation based on a pre-defined selection criteria and corresponds to the function used in assigning the signatures at the time the signature database is created. For example, the representations can be initially ordered according to an importance criteria and the most or least important representation is selected.

When $m_i$ corresponds to a maximum, for example, the representations assigned in step 74 are compared to each other for each block to determine a highest valued representation. These N×J highest valued representations are then assigned to the payload bit as their imprints, similarly to step 24 (refer to FIG. 1a) or to step 63 in FIG. 5a.

In the above example of j1 and j2, one maximum value is chosen for each set of hashes sh1, sh2 and sh3 assigned to a block. For j1: m1 is chosen from the first set of 700 hashes sh1; m2 is chosen from the first set of 700 hashes sh2; and m3 is chosen from the first set of 700 hashes sh3. The same occurs for j2.

It is noted that $h_i$ and $m_i$ may be chosen differently. For example, $m_i$ may not necessarily correspond to a maximum value from the values associated to each data block, it may correspond to any value from each group of T values assigned to a block after applying $HF_i$, the selection being based on a given selection criteria, or a ranking of all the representations according to a given order of importance. A minimum value could thus also be selected. The functions $m_i$ can be any function which selects any one representation deemed distinctive from a group of representations. The $h_i$ in 63 (FIG. 5*a*) should be the same as (or at least compatible with) the $h_i$ in 74 (FIG. 5*b*).

In step 76, since multiple imprints are determined for one file portion, and multiple file imprints form each file signature as determined in step 63 in FIG. 5*a*, the multiple imprints of the file portion are compared to the multiple file imprints of each file signature.

Step 78 is similar to step 27 of FIG. 1*a*, in which a match is determined between the file portion imprints and the file imprints forming the file signature. If no match is detected, the method returns to step 22. If a match is detected, the extra data are compared 28. A trace of file presence is reported in step 30 when a match is determined in step 29.

In step 80, an overall amount of stored traces for a given file, as detected via the detection on a transmission or on a storage medium of multiple file portions for which the imprints match the file's signature, is compared to a threshold amount. Above the threshold amount, there is a very high probability that the packet belongs to the file and thus that the file is being transmitted over the network. The threshold amount can be set by a user or determined by a suitable probabilistic algorithm. A maximum threshold amount is set to correspond to a total number of file imprints in a file signature.

Alternatively to the above, step 80 involves using a custom algorithm to determine if at least a portion of the file is present based on the number of traces detected and their associated extra data for that portion of file, and/or based on a content of a file portion for which a trace of transmission of that portion of file is detected.

If the file is detected, the method proceeds to step 82, if not, the method returns to step 22 and continues for a subsequent file portion passing over the network or otherwise being detected. In step 82, the presence of the file is detected and a report is outputted to indicate that file portion of the file is present. As an alternative to a report, an alarm can be set to inform a user of a known file detection. The report can also simply be stored for statistical analysis or other monitoring purposes. In the case of a file transmission, an action can also be taken upon detection of an undesired file transmission. For example, the transmission can be blocked before all the packets arrive at destination. Also, all subsequent file transfers coming from a same IP address as the one from which a detected file originated can be saved to be analyzed at a later time. Step 82 may involve outputting information relative to the file transmission, such as the Internet protocol (IP) address, or the network address, or the source and destination of the file transmission, as optionally extracted from the file portions in addition to the payload bits in step 22.

Figure 6:
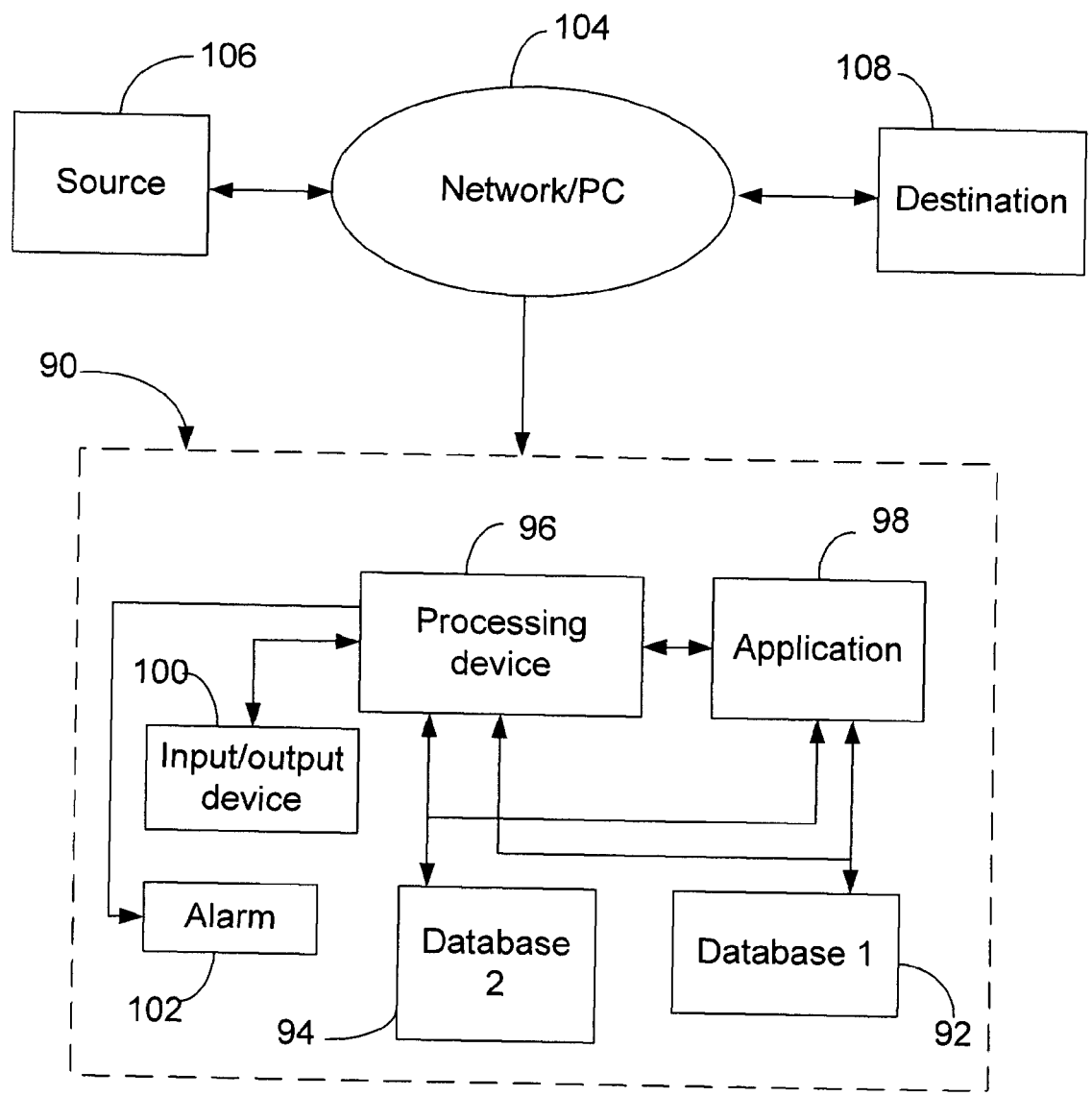
FIG. 6 is a system configured for detecting a presence of a file portion on a transmission, in accordance with one embodiment.

Now referring to FIG. 6, which illustrates an embodiment of a module 90 for detecting a transmission of a file over a network. The module 90 has two databases, 92 and 94, a processing device 96, an application 98, an input/output device 100 and an alarm 102. The module 90 operates to collect file portions circulating on various channels of the network 104, from a source 106 to a destination 108, or in some cases simply a router. It is noted that the network 104 can be any type of network; i.e. Internet, a local area network (LAN), wide area network (WAN), a wireless network or any other type of data transmission network. In another embodiment, the network can be a computer system such as a Personal Computer (PC). In yet another embodiment, the source can be any extension memory such as a USB storage medium or an external hard drive. The module 90 may operate on any type of computing device and is embodied on any type of computer readable medium. A Field Programmable Gate Array (FPGA) having programmable logic thereon may also be configured to operate any and/or all of the steps of the method described herein.

Figure 7:
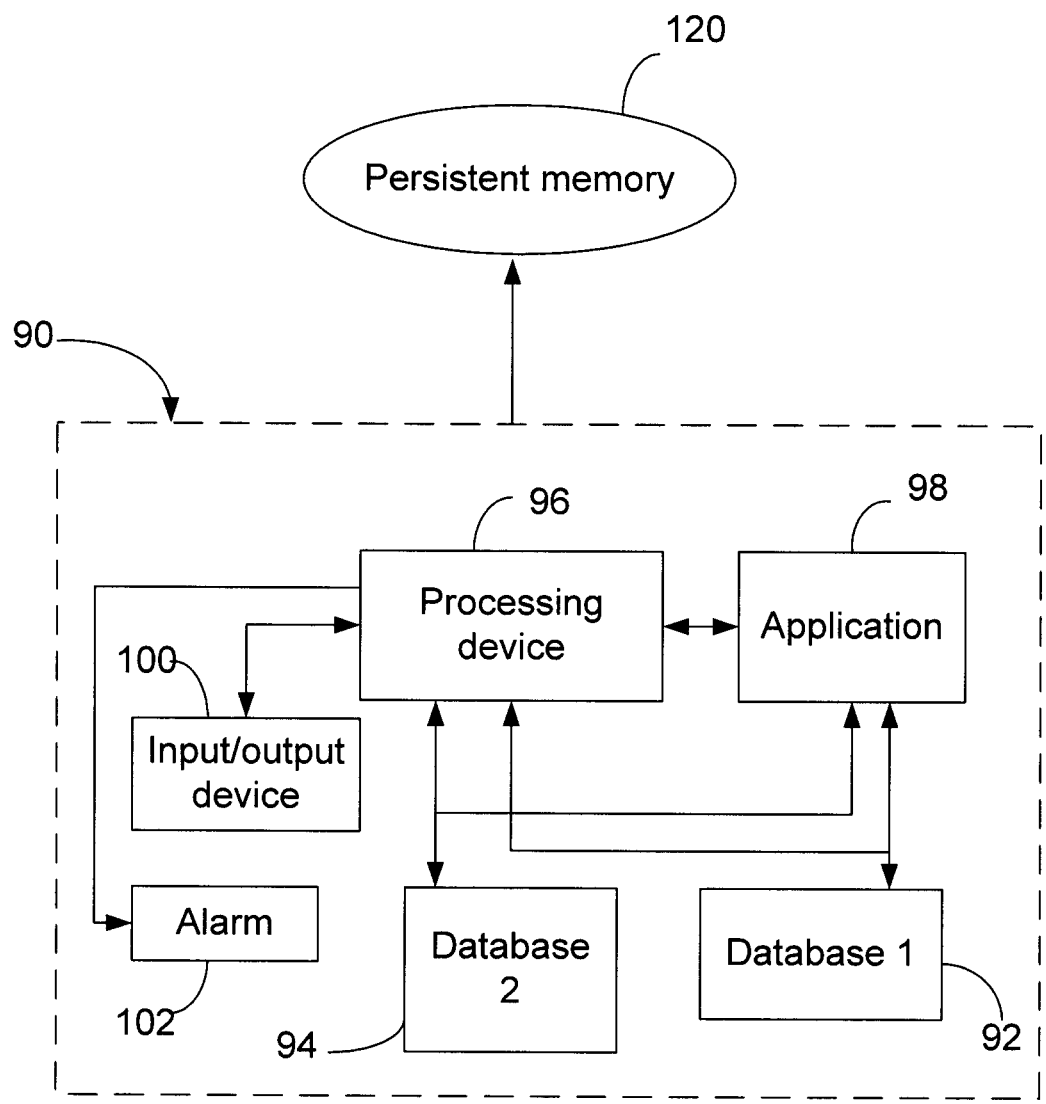
FIG. 7 is a module configured for detecting a presence of a file portion on a storage medium, in accordance with one embodiment.

Now referring to FIG. 7, which illustrates an embodiment of the module 90 for detecting a storage of an electronic file on a persistent memory 120. In this case, the module 90 is configured for reading data on the storage medium and scans sectors to detect the presence of a file portion.

In another embodiment, the persistent memory 120 can be a hard disk, CD, DVD or the like where files are split into sectors. The module 90 may detect file portions on the persistent memory 120 and determine whether or not they match a detection imprint and extra data corresponding to the detection imprint. It is noted that the module 90 can be a computer in a network executing a software process for detecting a file portion. The module 90 may operate on any type of computing device and is embodied on any type of computer readable medium. The module may also be embodied in a Field Programmable Gate Array (FPGA), or any other type of programmable processor.

The module 90 of FIGS. 6 and 7 is configured to implement the above-described method, as illustrated by the flow charts of FIGS. 1*a*, 1*b*, 5*a* and 5*b*.

The database 92 stores files for which presence shall be detected or monitored over the network 104 or from the persistent memory 120. The database 92 also stores extra data associated to each imprint of each file to be detected. This is optional as the files may also be stored remotely and accessed via the Internet or another method. The database 94 stores signatures formed from imprints of portions of these files along with an indication as to which file the signatures are assigned. Databases 92 and 94 can be any structure enabling quick retrieval of the information such as a hash table, an associative memory, an indexed memory, and others. Database 92 does not need to enable particularly quick retrieval. In addition, they may be combined into a single database or can each be implemented with multiple databases on multiple memory devices linked together in any suitable manner.

The processing device 96 is coupled to the databases 92 and 94, as well as to the application 98. The processing device 96 implements instructions, configurations or program codes of the application 98. The application 98 is configured for performing the steps of the method as described hereinabove. The processing device 96 can also be configured to implement tasks that are self-dedicated.

The input/output device 100 and the alarm 102 are used to report a file presence, or the detection of a trace indicating that an imprint of a file portion matches an imprint of a file signature. The network 104 and/or persistent memory 120 is accessed via the input/output device 100.

The device 100 can also be used to output information pertaining to a detected file presence on a channel, such as an identification of the source 106 and the destination 108 between which the file is being transferred. Other pertinent information, such as which file is detected and a time of detection or a time of transmission, or any other information useful for statistical or monitoring purposes, can be reported. Device 100 can also be used by a user to set various parameters, such as the threshold amount used to verify that a series of file portions passing over the network do correspond to a given file. Device 100 can also be used to perform an action upon a detection of an undesirable file transmission for example. Multiple devices may be connected together to correlate traces circulating via different network ports. For example, 10 devices having a 10 Gb/s capacity can be connected together to monitor a 100 Gb/s connection.

The databases 92, 94, the processing device 96 and the application 98 (or at least a subset thereof) can be implemented using field-programmable gate array (FPGA) technology which permits the detection of a file in real-time as it passes over the network 94 at a data rate of about 10 Gb/s or more. In order to increase the size of the databases, the FPGA may be connected to an external memory, such as a DDR2 memory found in a standard PC. Those skilled in the art would understand that any technology equivalent to FPGA that provides processing ability, large stocking capability and speed data rate can be applied.

To serve as an illustration, the above method can be performed by a particular FPGA module 90, which first determines a file signature by dividing the file into B=4 data blocks, each of the data blocks having applied a sliding hash function $h_i$ with a hash window $W_2$ of 16 bytes. Each one of the data sub-blocks is assigned to a representation by applying N hash functions $HF_i$:

$$HF_i(\text{sub-block}) = \text{binary value}_{sub-block} * c_i \text{ modulo } M; \quad (1)$$

where M is an arbitrary constant; i=1 ... N; and $c_i$ and M are chosen such that $c_i$ is primary with the constant M and that both $c_i$ and M represent an equal number of bits.

The choice of M and $c_i$ is made to ensure that a maximum number of values of imprints are possible for the given number of bits. The system can be implemented using various logical and arithmetical simplification techniques for calculating the modulo multiplication. For example, $HF_i$ can be determined entirely in the binary domain with a series of rotations, additions, and pre-calculated constants.

As an example, given a file portion being hashed into a sub-packet p[1.16], where M is $2^{64}-1$:

$$HF_i(x) = (x * c_i) \text{modulo } M$$

where x is the binary value of p[1 ... 16]
To simplify calculations of $HF_1$, consider y=binary value of p[2 ... 17]. Due to the choice of M:

$$y = x \cdot 256 - p[1] + p[17](\text{modulo } M); \text{ and}$$

$$HF_i(y) = 256 * HF_i(x) - HF_i(p[1]) + HF_i(p[17])(\text{modulo } M)$$

Since in binary *256 is a left shift of 8 positions (actually a rotation due to modulo M) and $HF_i(z)$ can be pre-calculated for any z within [0 ... 255], this method thereby enables very rapid detection.

The module and the method for detecting a presence of a file described hereinabove can be adapted for integration with commutators, routers or other switching and routing devices used in different network topologies. They can also be adapted for use with security applications such as anti-viruses or with various other network applications. Since the module only looks at file portions, it is non-intrusive. Therefore, it can be connected to any existing module having physical access to a Network port.

As noted above, files are generally divided into file portions when they are sent over a network or stored on sectors of a persistent memory. It is possible that a file portion only corresponds to a portion of a data block of a file being monitored, and from which a file imprint was determined since file portions may be smaller than the size of blocks. Using sub-blocks may help resolve this problem. However, the bytes that correspond to an imprint may be at the end of a first packet and at the beginning of a second packet. In this case, there is no match. For this reason, certain embodiments described above include the use of multiple imprints.

The above can be applied to various types of data files and formats, compressed or not, such as audio, images, video or other types of data. Such data can be arranged according to various dimensions and can also be detected using the above described methods, including but not limited to: zero-dimensional data such as tree structures (i.e. XML code), one-dimensional data such as a file, a digital sound recording, or a file portion for transmission; two-dimensional data such as an image; and three-dimensional data such as a video. For each of the above exemplified data types, the detection method uses elements extracted from the data in accordance with a given function or pattern. For data having no dimension, an extracted element can be a sub-tree having a given dimension K. For one-dimensional data, a sequence of adjacent elements or blocks can be extracted. For two-dimensional data files such as an image, an extracted element can be a rectangle, a circle or any particular shape or illustrated element found in the image itself. For a three-dimensional data file such as a video stream, a particular shape such as a rectangle or sphere which is found in a sub-sequence of the video stream for a given period of time can be extracted as an element of the file.

In one embodiment, the data transmissions which can be detected may also be a downloading or an uploading of a web page or the transmission of emails. The files being monitored for their transmission can further be associated to file imprints calculated from a compressed format of the same files. In this way, both the uncompressed and compressed format of the file can be detected over the network. In order to save memory space on the database 92 and 94, the module can also tag a file instead of storing the entire file.

It is noted that the above described module and method does not depend on a data transmission protocol which is used to transmit a file. Hence, the order in which file portions pass over the network and arrive at the detecting module has no impact.

While the blocks of the methods in FIGS. 1*a*, 1*b*, 5*a* and 5*b* are shown as occurring in a particular order, it will be appreciated by those skilled in the art that many of the blocks are interchangeable and may occur in different orders than that shown without materially affecting the end results of the methods. While the present disclosure is primarily described as a method, a person of ordinary skill in the art will understand that the present disclosure is also directed to an apparatus for carrying out the disclosed method and including apparatus parts for performing each described method block, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the disclosed method. It is understood that such apparatus, articles of manufacture, and computer data signals also come within the scope of the present disclosure.

The embodiments of the present disclosure described above are intended to be examples only. Those of skill in the art may effect alterations, modifications and variations to the particular example embodiments without departing from the intended scope of the present disclosure. In particular, selected features from one or more of the above-described example embodiments may be combined to create alternative example embodiments not explicitly described, features suitable for such combinations being readily apparent to persons skilled in the art. The subject matter described herein in the recited claims intends to cover and embrace all suitable changes in technology.

The invention claimed is:

1. A non-transitory computer readable medium having stored thereon computer readable instructions for execution by a processor for detecting a known electronic file, the instructions configured for:
   receiving a portion of a file and extracting content from the portion;
   dividing the content into data blocks;
   further dividing each data block into all possible contiguous sub-blocks of fixed width;
   applying N functions to all the sub-blocks, resulting in $N \times T_i$, representations being assigned to each data block, $T_i$ being a number of sub-blocks for an $i^{th}$ data block, i varying from 1 to J, J being a number of data blocks;
   selecting one representation per block per function based on a pre-defined importance selection criteria that one of maximizes and minimizes the pre-defined criteria, resulting in $N \times J$ representations being assigned to the portion of the file, wherein the pre-defined selection criteria corresponds to one of a highest hash value and a lowest hash value;
   assigning the $N \times J$ representations as file portion imprints;
   comparing the file portion imprints to contents of a first memory containing a plurality of file imprints for known electronic files to be detected, the file imprints having been created using at least the N functions; and
   determining a match when at least one of the file portion imprints corresponds to a file imprint in the first memory.

2. The computer readable medium of claim 1, wherein said applying N functions comprises applying said N functions sequentially to said sub-blocks.

3. The computer readable medium of claim 2, wherein said applying N functions comprises providing an overlap of said sub-blocks in sequential functions.

4. The computer readable medium of claim 1, further comprising, after said comparing said file portion imprints, identifying extra data surrounding data found in a sub-block used as one of said file portion imprints, and comparing said extra data to extra detection data stored in a second memory, said extra detection data corresponding to extra data surrounding data found in a sub-block used as said file imprint, and wherein said determining a match comprises determining a match when at least one of said file portion imprints and said extra data match said file imprint and said extra detection data, respectively.

5. The computer readable medium of claim 1, wherein applying N functions comprises applying at least two functions and resulting in at least two file portion imprints, and comparing said at least two imprints to said plurality of file imprints.

6. The computer readable medium of claim 1, wherein said file portion is from a two-dimensional file, and said blocks are regions of data, or wherein said file portion is from a three-dimensional file, and said blocks are volumes of data.

7. The computer readable medium of claim 1, wherein said applying N functions comprises applying a hashing function.

8. A system for detecting a known electronic file comprising:
   a processing device;
   a memory accessible by the processing device for storing a plurality of file imprints for known electronic files; and
   at least one application stored in the memory and having at least one of program code executable by the processing device and configuration data to configure the processing device, for:
   receiving a portion of a file and extracting content from the portion;
   dividing the content into data blocks;
   further dividing each data block into all possible contiguous sub-blocks of fixed width;
   applying N functions to all the sub-blocks, resulting in $N \times T_i$ representations being assigned to each data block, $T_i$ being a number of sub-blocks for an $i^{th}$ data block, i varying from 1 to J, J being a number of data blocks;
   selecting one representation per block per function based on a pre-defined importance selection criteria that one of maximizes and minimizes the pre-defined criteria, resulting in $N \times J$ representations being assigned to the portion of the file, wherein the pre-defined selection criteria corresponds to one of a highest hash value and a lowest hash value;
   assigning the $N \times J$ representations as file portion imprints;
   comparing the file portion imprints to the file imprints; and
   determining a match when at least one of the file portion imprints corresponds to one of the file imprints.

9. The system of claim 8, wherein at least one of the memory, the processing device, and a portion of the at least one application comprises at least one field programmable gate array.

10. A computer-implemented method for detecting an electronic file, the method comprising the steps of:
    receiving a portion of a file and extracting content from the portion;
    dividing the content into data blocks;
    further dividing each data block into all possible contiguous sub-blocks of fixed width;
    applying N functions to all the sub-blocks, resulting in $N \times T_i$ representations being assigned to each data block, $T_i$ being a number of sub-blocks for an $i^{th}$ data block, i varying from 1 to J, J being a number of data blocks;
    selecting one representation per block per function based on a pre-defined importance selection criteria that one of maximizes and minimizes the pre-defined criteria, resulting in $N \times J$ representations being assigned to the portion of the file, wherein the pre-defined selection criteria corresponds to one of a highest hash value and a lowest hash value;
    assigning the $N \times J$ representations as file portion imprints;
    comparing the file portion imprints to contents of a first memory containing a plurality of file imprints for known electronic files to be detected, the file imprints having been created using at least the N functions; and
    determining a match when at least one of the file portion imprints corresponds to a file imprint in the first memory.

11. The computer-implemented method of claim 10, wherein said applying N functions comprises applying said N functions sequentially to said sub-.

12. The computer-implemented method of claim 11, wherein said applying N functions comprises providing an overlap of said sub-blocks in sequential functions.

13. The computer-implemented method of claim 10, further comprising, after said comparing said file portion imprints, identifying extra data surrounding data found in a sub-block used as one of said file portion imprints, and comparing said extra data to extra detection data stored in a second memory, said extra detection data corresponding to extra data surrounding data found in a sub-block used as said file imprint, and wherein said determining a match comprises determining a match when at least one of said file portion imprints and said extra data match said file imprint and said extra detection data, respectively.

14. The computer-implemented method of claim 10, wherein applying N functions comprises applying at least two functions and resulting in at least two file portion imprints, and comparing said at least two imprints to said plurality of file imprints.

15. The computer-implemented method of claim 10, further comprising extracting content from said portion to remove noise.

16. The computer-implemented method of claim 10, wherein said file portion is from a two-dimensional file, and said blocks are regions of data, or wherein said file portion is from a three-dimensional file, and said blocks are volumes of data.

17. The computer-implemented method of claim 10, wherein said applying N functions comprises applying a hashing function.

\* \* \* \* \*